Feb. 9, 1937. G. F. CREMER 2,070,259
BATTERY CABLE TERMINAL
Filed March 4, 1935
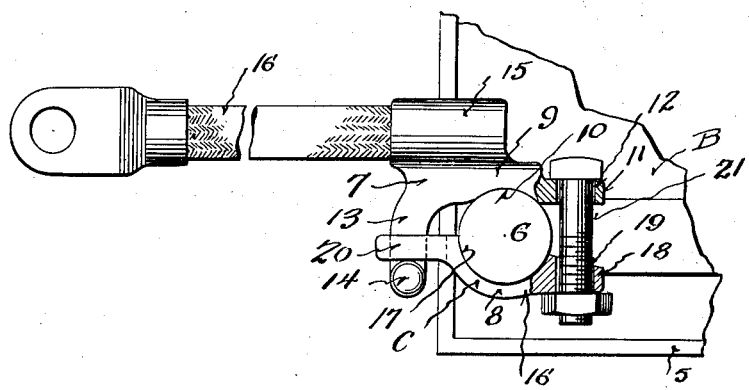
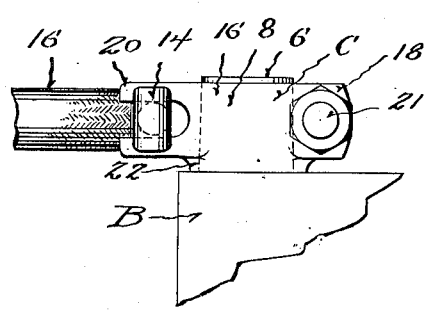
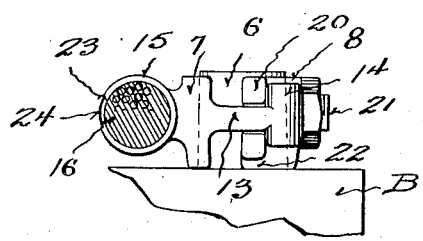
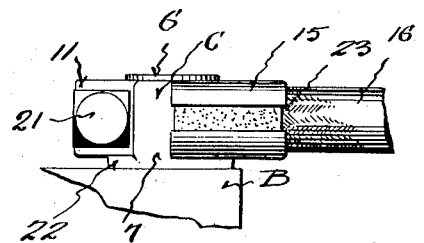
Inventor
G. F. Cremer Patented Feb. 9, 1937

2,070,259

UNITED STATES PATENT OFFICE 2,070,259

BATTERY CABLE TERMINAL

George F. Cremer, Milwaukee, Wis.,

Application March 4, 1935, Serial No. 9,259

1 Claim. (Cl. 173—259)

This invention appertains to storage batteries, and more particularly to a novel cable terminal for the posts of the battery.

Great difficulty is experienced in removing the terminals from the battery posts, due to the corroding of the terminals. Generally, a screwdriver or like implement is utilized in effort to pry the terminals loose from the posts. Much time is wasted in this effort, and considerable injury is often caused to the batteries. Therefore, one of the salient objects of my invention is to provide a novel cable terminal, which can be readily applied to and tightened on the post, and quickly or easily removed from the post, without injury to the terminal or the post, or other parts of the battery.

Another important object of my invention is to provide a battery cable terminal clip, including a pair of independent sections for embracing the posts, slidably and rockably connected together at one end, and adjustably connected by a tightening bolt at the opposite end, the connection being such that the parts can be readily separated irrespective of the corroded condition of the post, to quickly effect the removal of the terminal clip from the post without injury to the battery.

A further object of my invention is the provision of a terminal clip embodying a pair of independent sections, having a sliding and locking connection at one end, whereby the terminal clip can be easily fitted to various sizes of battery posts, the sections being brought into snug engagement with the post, irrespective of the size thereof.

A further object of my invention is the provision of means for spacing the bolt-receiving ears from the top face of the battery, whereby the bolt and its nut can be expeditiously manipulated to bring about the loosening or the tightening of the terminal clip on the post A further object of my invention is the provision of novel means for forming the cable-receiving sleeve on the terminal clip, whereby the cable will be at all times out of the way of projecting parts on the battery, such as the battery handles and the like.

A still further object of my invention is to provide an improved battery terminal of the above character, which will be durable and efficient in use, one that will be simple and easy to manufacture, and one which can be placed upon the market at a reasonable cost.

With these and other objects in view the invention consists in the novel construction, arrangement, and formation of parts, as will be hereinafter more specifically described, claimed, and illustrated in the accompanying drawing, in which drawing:—

Figure 1 is a top plan view of my improved cable terminal, showing the same applied to a terminal post of a storage battery, parts of the cable terminal clip being shown broken away and in section.

Figure 2 is a side elevation of my improved cable terminal clip, showing the same applied to the post of a battery.

Figure 3 is an end elvation of the cable terminal clip, showing the same applied to the battery, the cable being shown in section Figure 4 is a side elevation of the improved cable terminal clip, looking in the opposite direction from Figure 2, the terminal clip being shown applied to the battery.

Referring to the drawing in detail, wherein similar reference characters designate corresponding parts throughout the several views, the letter "C" generally indicates my improved cable terminal clip for a storage battery "B".

Only a fragment of the battery "B" has been shown, and the same can be considered as of any preferred make or type. The battery "B" includes the usual case 5, and the upstanding terminal post 6.

My improved cable terminal clip "C" embodies a pair of companion gripping sections 7 and 8, which can be formed from any desired type of material, such as brass provided with a coating of tin.

Referring more particularly to the section 7, it can be seen that the same includes a main body portion 9, having its inner face curved as at 10, for fitting against the outer surface of the battery post. Formed on one end of the body 9 is the outwardly projecting ear 11 having an enlarged bolt hole 12. Extending laterally from the other end of the body 9 is an arm 13 having formed on its outer end the substantially cylindrical lug 14, the purpose of which will be later set forth. It is to be noted, however, that the lug 14 is spaced a considerable distance from the body 9. Formed integral with the body 9 is a sleeve 15 for receiving the battery cable 16. The construction and arrangement of this sleeve will be more specifically set forth. The other section 8 of my improved terminal clip includes a main body portion 16, having its inner face curved as at 17 to fit against the battery post. One end of the body 16 has formed thereon the bolt-receiving ear 18, and it is to be noted that this ear is likewise provided with an enlarged opening 19 for the bolt. The opposite end of the body 16 has formed thereon a yoke or a bifurcated arm 20, which is adapted to slidably engage the laterally extending arm 13 on the section 7. The lug 14 forms a stop for the yoke 20, and it can be seen that the section 8 is free to rock on the arm 13, and that the same also has a limited sliding movement on the arm, whereby the sections 7 and 8 can expand relative to one another, to effectively grip different sizes of posts.

In use of my improved cable terminal, the section 8 is associated with section 7 by placing the yoke or bifurcated arm 20 on the laterally extending arm 13, and the tightening bolt 21 is placed through the enlarged openings 12 and 19 in the ears 11 and 18. The cable terminal clip can now be applied to the post, and the same is slid down on the post into engagement with the top of the battery. Upon the adjustment of the nut of the bolt, the sections can be readily brought into intimate gripping contact with the post. This insures the proper electrical contact between the post and the terminal clip. Particular attention is invited to the fact that both of the sections 7 and 8 are provided with semi-circular depending extensions 22 on the lower faces of their body portions for engagement with the top wall of the battery. This spaces the bolt-receiving ears 11 and 18 from the top face of the battery, and allows the easy gripping of the bolt and its nut to effect the quick turning of the nut without injury to the battery.

When it is desired to remove the terminal clip from the battery post, the bolt is loosened so that the sections 7 and 8 can be swung relative to one another. This usually effects the release of the terminal clip from the post, but where the post is unusually corroded, a screw-driver or like implement can be placed between the ears 11 and 18, so as to pry these ears apart and away from the post 6. I have found that this will instantly separate the sections from the post so that the terminal clip can be easily lifted from the post without prying the terminal clip up on the post. In other words, the formation of my terminal clip is such that it is unnecessary to place a screw-driver or like implement between the battery and terminal clip, and thus all danger of injuring the battery is eliminated.

Again referring to the cable-receiving sleeve 15, it is to be noted that the same extends parallel with the body 9, and hence the cable 16 and the sleeve are out of the way of all projecting parts on the battery, including the handle, and the cable 16 can be readily led from the battery to its desired point of connection. Obviously, however, the sleeve can be led from the body 9 at any desired angle without departing from the spirit or scope of my invention.

I prefer to make the sleeve 15 with a longitudinally extending slit 23. This allows the easy insertion of the cable 16 into the sleeve 15, and the sleeve can then be bent around the cable. Solder or the like 24 can then be utilized for holding the cable in place, and to insure the proper contact.

It is to be also understood that I do not desire to limit myself to the use of the split sleeve, as the sleeve can be formed unbroken without departing from the spirit or scope of my invention.

Other changes in details can be made without departing from the spirit or scope of this invention, but what I claim as new is:—

A cable terminal clip for storage batteries comprising a pair of independent companion sections, a cable-receiving sleeve carried by one section, each of said sections including a companion body portion having arcuate inner faces for engaging a battery post, bolt-receiving ears formed on the ends of the body portion at one side, a laterally extending arm formed on the other end of one body portion, a stop on the outer end of the arm, a yoke on the other body portion straddling the arm and bearing against the stop, a tightening bolt extending loosely through the ears, and depending flanges formed on the lower edges of the body portions of the sections, whereby to space the ears and the cable-receiving sleeve from the upper face of the battery to facilitate adjustment of the bolt, said arm being cylindrical, whereby the yoke is free for swinging and sliding movement thereon to permit the sections to adjust themselves on the battery post.

GEORGE F. CREMER.